(12) United States Patent
Scott et al.

(10) Patent No.: US 7,106,173 B2
(45) Date of Patent: Sep. 12, 2006

(54) TAGS, WIRELESS COMMUNICATION SYSTEMS, TAG COMMUNICATION METHODS, AND WIRELESS COMMUNICATIONS METHODS

(75) Inventors: Jeff W. Scott, Pasco, WA (US);
Richard M. Pratt, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 623 days.

(21) Appl. No.: 10/336,086

(22) Filed: Jan. 3, 2003

(65) Prior Publication Data

US 2004/0132406 A1 Jul. 8, 2004

(51) Int. Cl.
*H04Q 5/22* (2006.01)
*G08B 13/14* (2006.01)
*G08B 25/00* (2006.01)
*H04B 5/00* (2006.01)
*H04B 7/00* (2006.01)

(52) U.S. Cl. ............... 340/10.1; 340/10.41; 340/10.34; 340/572.7; 340/825.98; 340/572.1; 455/41.1; 455/41.2

(58) Field of Classification Search ............... 455/41.1, 455/41.2; 340/10.1, 10.41, 10.34, 572.7, 340/825.98, 572.1
See application file for complete search history.

(56) References Cited

U.S. PATENT DOCUMENTS

| | | | |
|---|---|---|---|
| 5,448,110 A | 9/1995 | Tuttle et al. | |
| 5,572,226 A | 11/1996 | Tuttle | |
| 5,621,913 A | 4/1997 | Tuttle et al. | |
| 5,719,586 A | 2/1998 | Tuttle | |
| 5,776,278 A | 7/1998 | Tuttle et al. | |
| 5,779,839 A | 7/1998 | Tuttle et al. | |
| 5,787,174 A | 7/1998 | Tuttle | |
| 5,889,489 A | 3/1999 | Friedman et al. | |
| 6,045,652 A | 4/2000 | Tuttle et al. | |
| 6,078,791 A | 6/2000 | Tuttle et al. | |
| 6,094,138 A | 7/2000 | Eberhardt et al. | |
| 6,118,379 A | 9/2000 | Kodukula et al. | |
| 6,144,916 A | 11/2000 | Wood, Jr. et al. | |
| 6,150,986 A | 11/2000 | Sandberg et al. | |

(Continued)

FOREIGN PATENT DOCUMENTS

WO    WO 0171645    9/2001

OTHER PUBLICATIONS

"RO4000® Series High Frequency Circuit Materials"; Rogers Corporation; www.rogers-corp.com/mwu; 2000; pp. 1-4.

(Continued)

*Primary Examiner*—Jeffery Hofsass
*Assistant Examiner*—Scott Au
(74) *Attorney, Agent, or Firm*—Wells St. John, P.S.

(57) ABSTRACT

Tags, wireless communication systems, tag communication methods, and wireless communications methods are described. In one aspect, a tag includes a plurality of antennas configured to receive a plurality of first wireless communication signals comprising data from a reader, a plurality of rectifying circuits coupled with. respective individual ones of the antennas and configured to provide rectified signals corresponding to the first wireless communication signals, wherein the rectified signals are combined to produce a composite signal, an adaptive reference circuit configured to vary a reference signal responsive to the composite signal, a comparator coupled with the adaptive reference circuit and the rectifying circuits and configured to compare the composite signal with respect to the reference signal and to output the data responsive to the comparison, and processing circuitry configured to receive the data from the comparator and to process the data.

49 Claims, 7 Drawing Sheets

U.S. PATENT DOCUMENTS

| | | |
|---|---|---|
| 6,177,872 B1 | 1/2001 | Kodukula et al. |
| 6,215,402 B1 | 4/2001 | Rao Kodukula et al. |
| 6,220,516 B1 | 4/2001 | Tuttle et al. |
| 6,239,703 B1 | 5/2001 | Friedman et al. |
| 6,234,013 B1 | 6/2001 | Duan et al. |
| 6,243,013 B1 * | 6/2001 | Duan et al. ............... 340/572.7 |
| 6,281,794 B1 | 8/2001 | Duan et al. |
| 6,320,509 B1 | 11/2001 | Brady et al. |
| 6,329,915 B1 | 12/2001 | Brady et al. |
| 6,375,780 B1 | 4/2002 | Tuttle et al. |
| 6,400,274 B1 | 6/2002 | Duan et al. |
| 6,424,315 B1 | 7/2002 | Glenn et al. |
| 6,597,316 B1 * | 7/2003 | Rao et al. ............ 343/700 MS |
| 6,914,528 B1 | 7/2005 | Pratt et al. |
| 2001/0007335 A1 | 7/2001 | Tuttle et al. |
| 2002/0067267 A1 | 6/2002 | Kirkham |
| 2002/0118108 A1 | 8/2002 | Carrender |
| 2004/0198233 A1 | 10/2004 | Pratt et al. |

OTHER PUBLICATIONS

"Wireless Communication Devices, Radio Frequency Identification Devices, Backscatter Communication Device Wake-Up Methods, Communication Device Wake-Up Methods And A Radio Frequency Identification Device Wake-Up Method": Richard M. Pratt et al.; U.S. Appl. No. 09/797,539; filed Oct. 2, 2002.

"Antenna Matching Circuit"; C. L. Carrender; U.S. Appl. No. 09/797,539, filed Feb. 28, 2001.

Search Report mailed Jun. 2, 2004; Serial No. PCT/US03/41246; Filed Dec. 24, 2003; 4 pps.

* cited by examiner

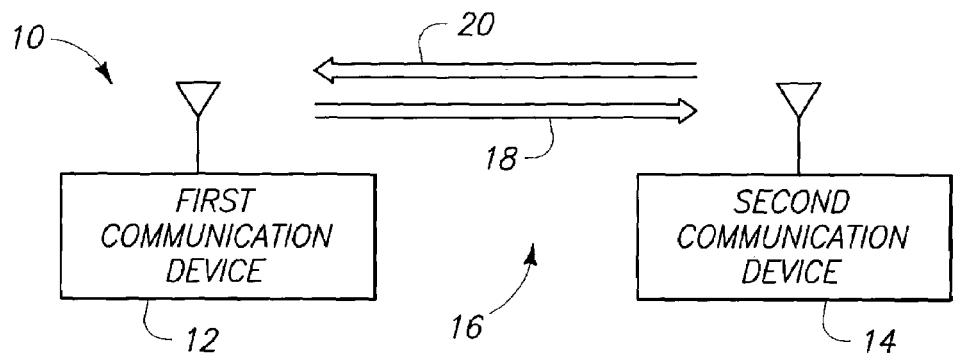
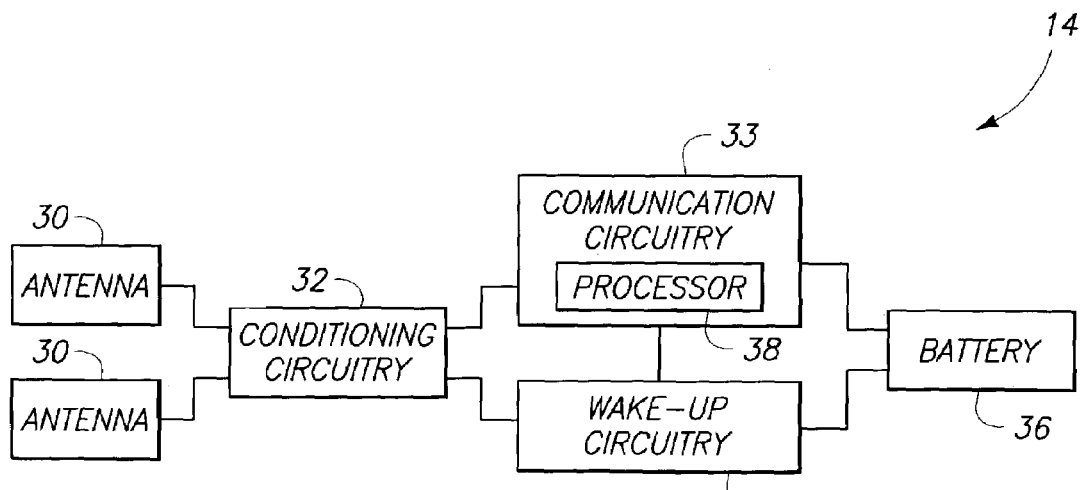

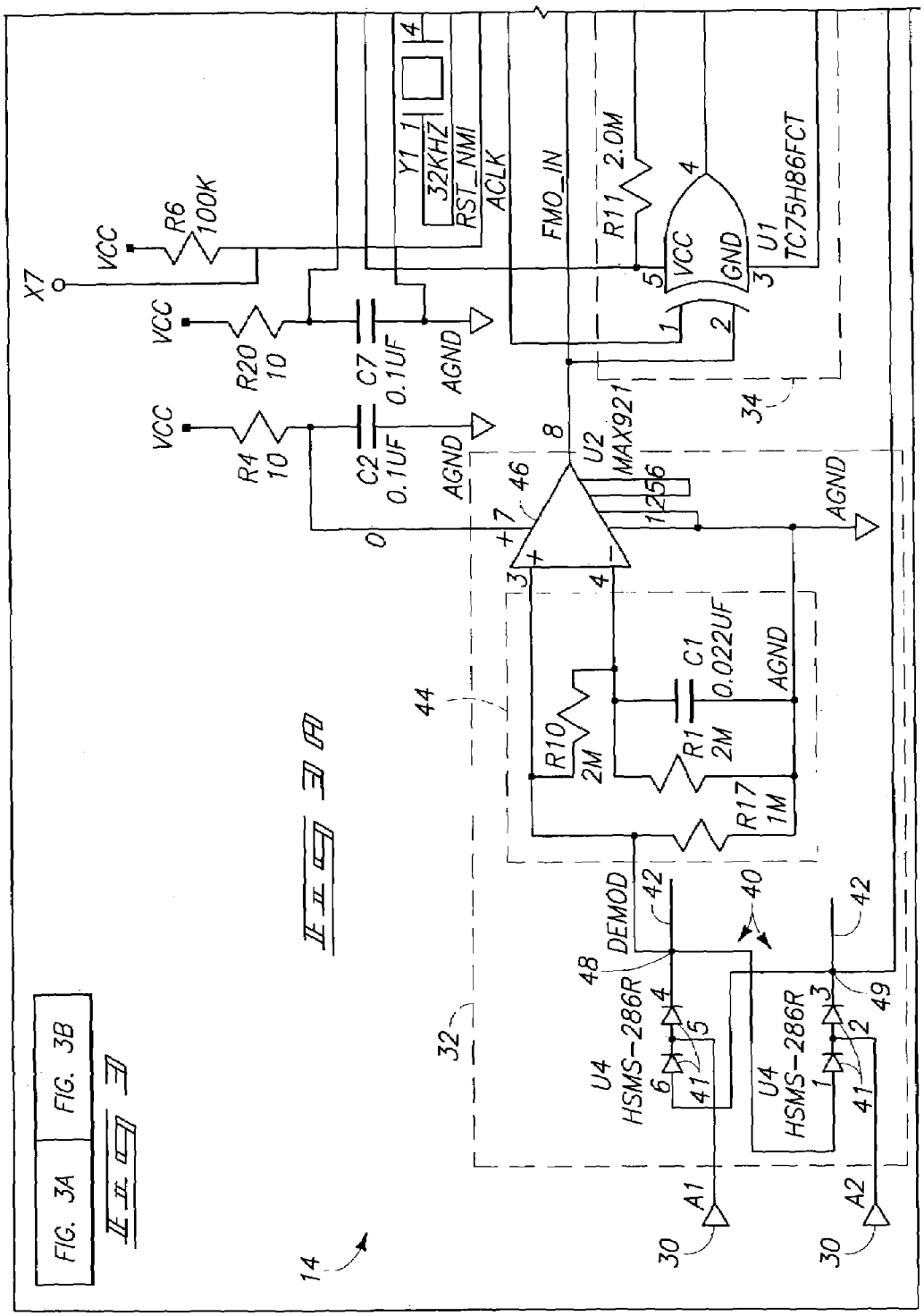

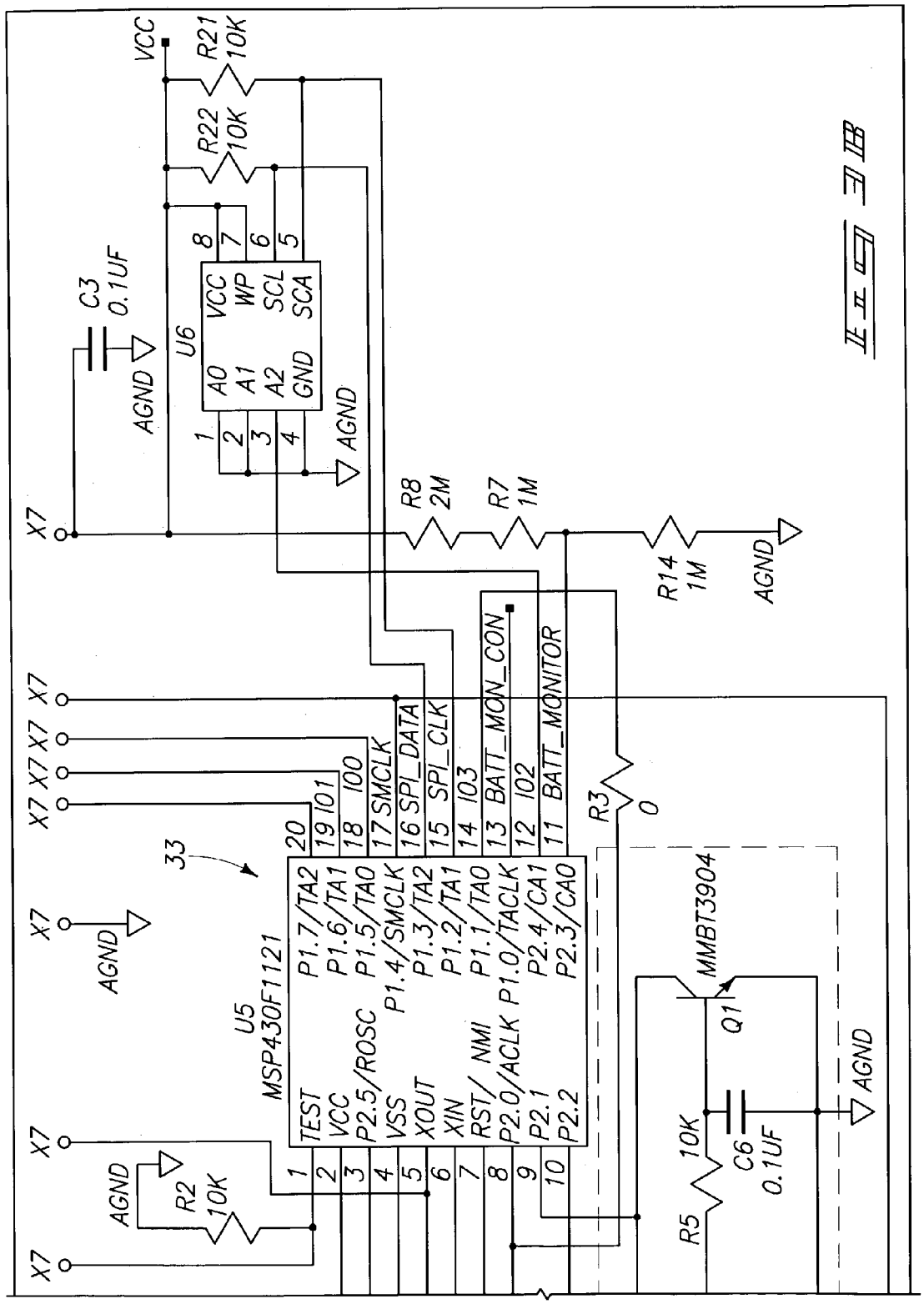

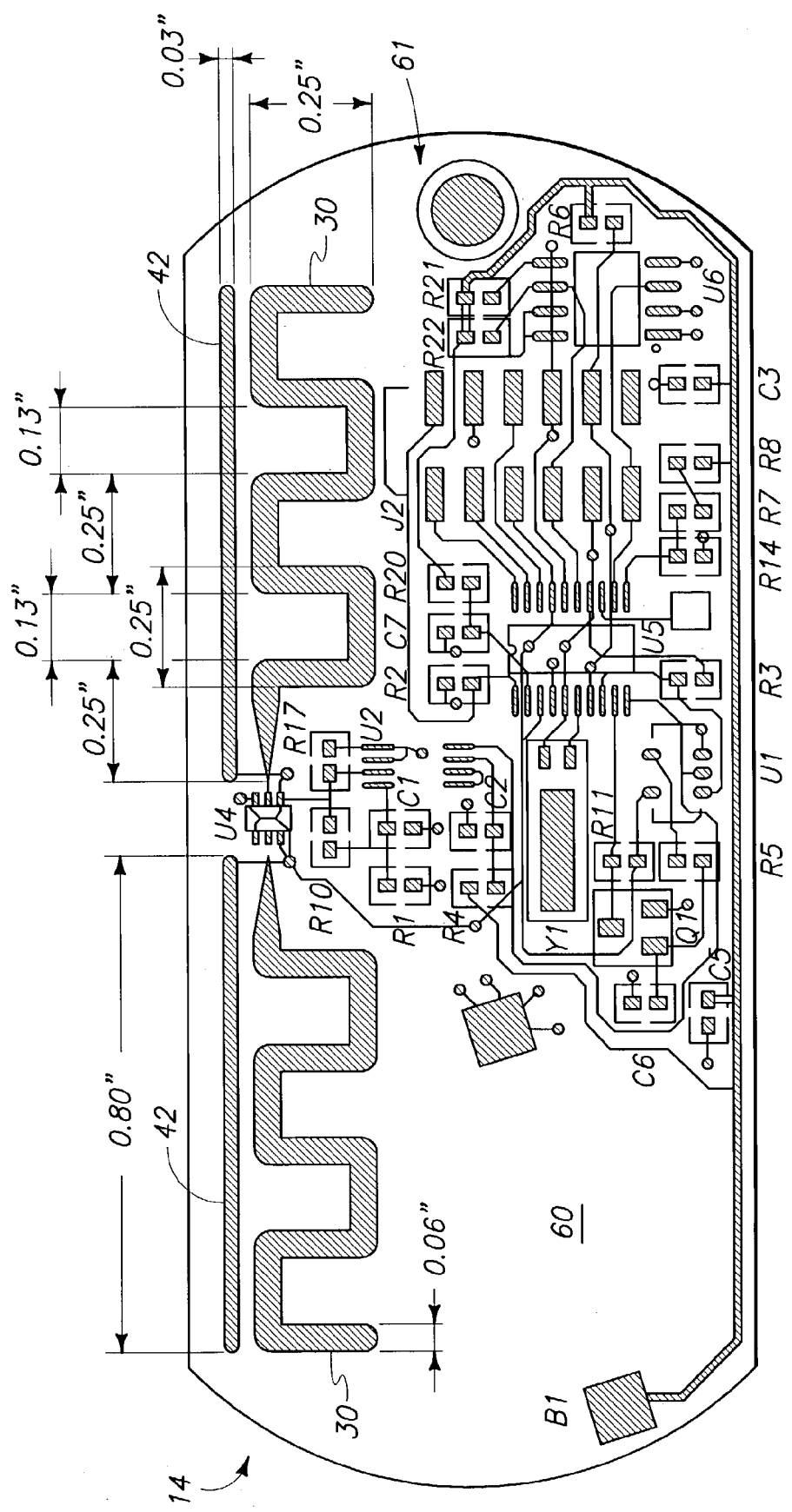

TAGS, WIRELESS COMMUNICATION SYSTEMS, TAG COMMUNICATION METHODS, AND WIRELESS COMMUNICATIONS METHODS

GOVERNMENT RIGHTS STATEMENT

This invention was made with Government support under Cantract DE AC0676RLO1830 awarded by the U.S. Department of Energy. The Government has certain rights in the invention.

TECHNICAL FIELD

This invention relates to tags, wireless communication systems, tag communication methods, and wireless communications methods.

BACKGROUND OF THE INVENTION

Wireless communications between remotely located communicating devices may be implemented using radio frequency (RF) technology. Radio frequency communications have continued to improve through recent decades. Relatively sophisticated components are commonplace enabling radio frequency communications at microwave frequencies in compact components and at reasonable cost.

Some exemplary applications utilizing radio frequency technology include identification applications including, for example, locating, identifying, and tracking of objects. Radio frequency identification device (RFID) systems have been developed to facilitate identification operations. For example, one device may be arranged to output and receive radio frequency communications and one or more remotely located device may be configured to communicate with the one device using the radio frequency communications. The remotely located device may be referred to as a tag, while the other device may be referred to as a reader. Some advantages of radio frequency communications including exemplary radio frequency identification device communications include abilities to communicate without contact or line-of-sight, at relatively fast speeds, and with robust communication channels.

Radio frequency systems typically enable communications between devices located at increased distances compared with inductively coupled identification device systems. Even with radio frequency systems, it may be desired in some communication system applications to increase or maximize a communications range between the remotely located devices. Alternatively or additionally, it may be desired to reduce the transmitting power of the reader device in a particular application. Accordingly, it may be preferred to increase the sensitivity of a tag of the system to provide improved wireless communications between the remotely located devices.

Some aspects of the present invention described below provide wireless communication devices having increased sensitivity.

BRIEF DESCRIPTION OF THE DRAWINGS

Preferred embodiments of the invention are described below with reference to the following accompanying drawings.

FIG. 1 is functional block diagram of an exemplary wireless communication system.

FIG. 2 is a functional block diagram of components of an exemplary wireless communication device of the system.

FIG. 3 is a map showing how FIGS. 3A and 3B are to be assembled. Once assembled, FIGS. 3A and 3B are a schematic representation of exemplary circuitry of the device of FIG. 2.

FIG. 4 is an illustrative representation of an exemplary circuit component layout of one side of the device of FIG. 2.

DETAILED DESCRIPTION OF THE PREFERRED EMBODIMENTS

Figure 5:
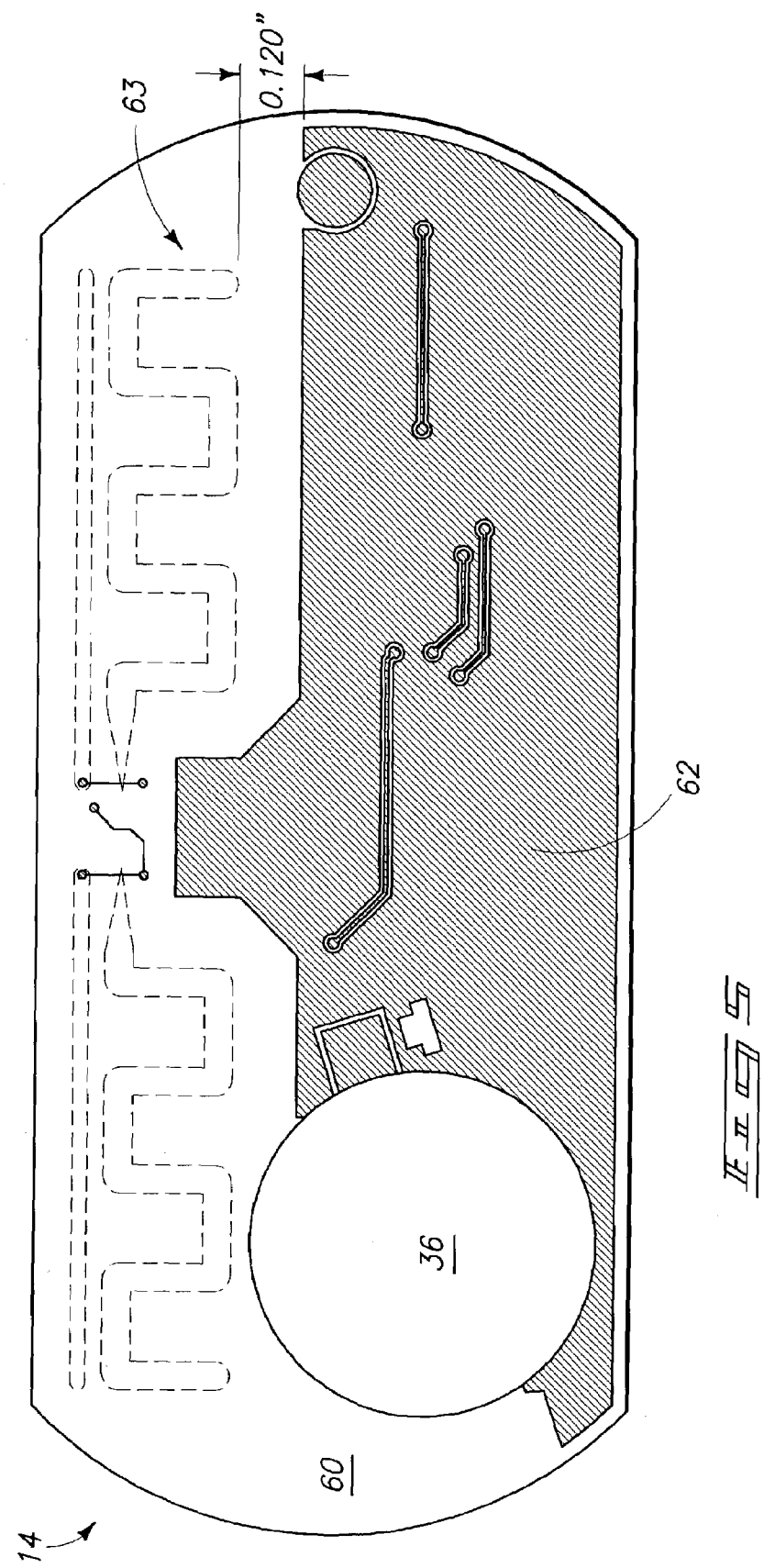
FIG. 5 is an illustrative representation of an exemplary circuit component layout of another side of the device of FIG. 2.

According to one aspect of the invention, a tag comprises a plurality of antennas configured to receive a plurality of first wireless communication signals comprising data from a reader, a plurality of rectifying circuits coupled with respective individual ones of the antennas and configured to provide rectified signals corresponding to the first wireless communication signals, wherein the rectified signals are combined to produce a composite signal, an adaptive reference circuit configured to vary a reference signal responsive to the composite signal, a comparator coupled with the adaptive reference circuit and the rectifying circuits and configured to compare the composite signal with respect to the reference signal and to output the data responsive to the comparison, and processing circuitry configured to receive the data from the comparator and to process the data.

According to another aspect of the invention, a wireless communication system comprises a reader configured to output a plurality of first wireless communication signals comprising data and a tag comprising a plurality of antennas configured to receive the first wireless communication signals from the reader, processing circuitry configured to receive the data of the first wireless communication signals and to control backscatter modulation of radio frequency energy to communicate a plurality of second wireless communication signals to the reader, and a battery configured to provide operational electrical energy to the processing circuitry.

According to another aspect of the invention, a tag communication method comprises receiving a plurality of first wireless communication signals from a reader using a plurality of antennas of a tag, providing a plurality of electrical signals within the tag and corresponding to the first wireless communication signals received using respective ones of the antennas, combining the electrical signals using the tag, processing the combined electrical signals using the tag, and backscatter modulating radio frequency energy using the tag to output a plurality of second wireless communication signals for communication to the reader.

According to yet another aspect of the invention, a wireless communication method comprises providing a reader, providing a tag comprising a plurality of antennas, outputting a plurality of first wireless communication signals comprising data using the reader, receiving the first wireless communication signals using the antennas of the tag, combining electrical signals corresponding to respective ones of the first wireless communication signals within the tag, and processing data of the combined electrical signals using processing circuitry of the tag after the combining.

Referring to FIG. 1, an exemplary wireless communications system 10 is depicted. The exemplary system 10 includes a first wireless communication device 12 and a second wireless communication device 14. The depicted system 10 including a single device 12 and a single device 14 is illustrative and additional communication devices are typically provided in other system configurations.

First and second communication devices 12, 14 are arranged to implement wireless communications 16 in the depicted exemplary embodiment. Possible wireless communications 16 include first wireless communication signals 18 communicated from first communication device 12 and second wireless communication signals 20 communicated from second communication device 14. In some arrangements, device 14 is a transponder and communicates signals 20 responsive to the reception of signals 18.

As mentioned above, system 10 is provided to illustrate exemplary structural and method aspects of the present invention. In one possible implementation of system 10, first communication device 12 may be implemented as a reader, and second communication device 14 may be implemented as a transponder, such as a tag. Although only individual devices 12, 14 are shown in FIG. 1, one device 12 may be configured to communicate with a plurality of devices 14. System 10 may be arranged as a radio frequency identification device (RFID) communications system and device 14 may be referred to as a RFID tag.

Exemplary wireless communications 16 include electromagnetic communication signals, such as radio frequency signals. Wireless communications 16 may additionally include other signals, such as continuous wave signals, communicated for example using device 12 implemented as a reader to facilitate the communication of signals 20 comprising backscatter signals in one exemplary configuration described in further detail below.

Referring to FIG. 2, an exemplary arrangement of second communication device 14 is shown. The exemplary configuration of device 14 includes a plurality of antennas 30, conditioning circuitry 32, processing circuitry 33, wake-up circuitry 34 and a battery 36. The illustrated arrangement of second communication device 14 including battery 36 may be implemented in a semi-passive configuration or active device configuration. Other configurations of device 14 are possible including more, less or alternative components.

In semi-passive implementations of device 14, battery 36 is utilized to provide electrical energy to processing circuitry 33 and wake-up circuitry 34 to implement processing of wireless signals 18 while electromagnetic energy received within device 14 is utilized to generate wireless signals 20.

For active implementations, battery 36 is utilized to provide operational electrical energy to processing circuitry 33 and wake-up circuitry 34. In addition, electrical energy of battery 36 may also be utilized to generate radio frequency energy for communication of signals 20.

Device 14 may also be implemented in a passive configuration. For passive implementations of device 14, received electromagnetic energy is utilized to provide operational electrical energy to components of device 14 (e.g., via a capacitor), as well as provide radio frequency energy for communicating wireless signals 20 (e.g., backscatter signals). In such an implementation, battery 36 may be omitted.

Antennas 30 are arranged in but one aspect to receive electromagnetic energy including signals 18 and to output electromagnetic energy including signals 20. Alternative configurations are possible. For example, antennas 30 may be arranged for receive operations and additional antennas (not shown) may be provided to communicate signals 20.

As described further below, detected waveforms from antennas 30 may be added together to provide device 14 having increased sensitivity for utilization, for example, in long range or low RF power shortrange applications. In one example of such a configuration, antennas 30 are tuned to at least substantially the same frequency band. In other configurations, one of antennas 30 may be substantially tuned to a first frequency band and the other of antennas 30 may be substantially tuned to a second frequency band different than the first frequency band.

In one exemplary embodiment, conditioning circuitry 32 is configured to provide electrical signals corresponding to wireless signals 18 received via antennas 30. For example, circuitry 32 may rectify received waveforms providing electrical signals. The conditioning circuitry 32 may additionally combine or add the electrical signals together, provide filtering operations to remove spurious signals, and extract data communicated from communication device 12 using signals 18 for application to processing circuitry 33 and/or wake-up circuitry 34.

In one exemplary configuration, processing circuitry 33 includes a microprocessor 38 and supporting circuitry. Different circuitry of the processor 38 and/or device 14 may be activated and/or utilized during different modes of operation of device 14 responsive to wake-up circuitry 34 as described below. An exemplary processor comprises a model number MSP430F1121 available from Texas Instruments, Inc. Other processor configurations are possible.

Processing circuitry 33 is configured in at least one embodiment to receive and process data communicated from communication device 12 using signals 18 and to control communication of signals 20 to device 12. Generation of wireless signals 20 responsive to control from processor 38 may be responsive to processing of data received in signals 18 by processor 38 or responsive to other stimulus (e.g., internally generated). Processor 38 of processing circuitry 33 may be configured to execute code instructions to process data, to control communication operations, and to control other operations of device 14.

Processing circuitry 33 may control outputting of wireless signals 20 using backscatter modulation according to one backscatter embodiment. Processor 38 may provide a modulation signal to alter electrical characteristics of one or more of antennas 30 (or one or more dedicated backscatter antenna) wherein electromagnetic energy is selectively reflected by the controlled antenna(s). The controlled antenna(s) reflect electromagnetic energy creating wireless signals 20 responsive to the modulated signal including data from processor 38 according to one exemplary backscatter implementation.

Processing circuitry 33 may implement communications according to a radio frequency identification device communications protocol in one arrangement. Processing circuitry 33 arranged to implement RFID communications may be referred to as radio frequency identification device communication circuitry. As mentioned above, circuitry 33 may be operable to control communication of wireless signals 20 responsive to processing of one or more wireless signal 18. For example, circuitry 33 may implement backscattered transponder communications in one exemplary RFID embodiment.

The modulated signal may be encoded with data or information to be communicated from device 14 to device 12. Exemplary information includes identification information, such as a unique serial number which identifies the communicating device 14, or any other desired information to be communicated. According to one exemplary arrangement, communication devices 12, 14 are configured to communicate wireless signals 18, 20 using on/off key (OOK) modulation, such as a FM0 or FM1 encoding scheme. Other modulation techniques or protocols may be utilized to communicate information between devices 12, 14.

Processing of received signals 18 within device 14 may include extracting an identifier from the wireless. signals 18 (e.g., an identifier of the communicating device 12 and/or device 14) and/or processing of commands within signals 18. Responsive to the processing, device 14 may selectively output or communicate wireless signals 20 including identification information or other desired information requested by first communication device 12, or otherwise desired to be communicated to device 12 or other recipient.

Wake-up circuitry 34 is coupled with processing circuitry 33 and processor 38 and is configured to control one or more operation of circuitry 33 and/or processor 38. In at least one embodiment, wake-up circuitry 34 is arranged to control operations of device 14 including processing circuitry 33 and/or processor 38 in a plurality of operational modes. For example, it may be desired to conserve electrical energy of battery 36 in order to extend the useful, operational life of battery 36. The operational modes have different power requirements and result in the utilization of electrical energy of battery 36 at different rates. Wake-up circuitry 34 controls operation of device 14 in the different modes of operation in one exemplary embodiment to conserve electrical energy of battery 36. Details regarding operations of exemplary wake-up circuitry 34 are described in co-pending U.S. patent application Ser. No. 10/263,940, filed on Oct. 2, 2002, entitled "Radio Frequency Identification Devices, Backscatter Communication Device Wake-Up, Methods, Communication Device Wake-Up, Methods And A Radio Frequency Identification Device Wake-Up Method", listing Richard M. Pratt and Mike A. Hughes as inventors, the teachings of which are incorporated herein by reference.

Battery 36 is arranged to provide electrical energy to components of device 14 including processing circuitry 33. As mentioned above, battery 36 may be omitted in some configurations and other power sources, such as received radio frequency energy, may be utilized for at least some device operations.

Referring to FIGS. 3A–3B, an exemplary configuration of device 14 of FIG. 2 is shown. Antennas 30 are coupled with conditioning circuitry 32. The illustrated exemplary conditioning circuitry 32 includes plural respective rectifying circuits 40, stub circuits 42, an adaptive reference circuit 44 and a comparator 46.

In general, individual electrical signals corresponding to received wireless signals 18 may be combined within conditioning circuitry 32. The combined electrical signals may be utilized to adjust a reference signal which is provided to comparator 46 which in turn is configured to provide data of signals 18 to processing circuitry 33 responsive to comparison operations.

For example, rectifying circuits 40 are coupled with respective antennas 30 and are configured to provide rectified signals corresponding to signals 18 received during receive operations. Circuits 40 are arranged as cascaded voltage doubling circuits in the exemplary configuration. For example, the depicted circuits 40 individually comprise a plurality of diodes 41 configured as a full-wave rectifier circuit. Common nodes 48, 49 are illustrated and are individually coupled with diodes of circuits 40. Node 48 is coupled with cathodes of the diodes and node 49 is coupled with anodes of the diodes. As shown, node 48 is coupled with an input of comparator 46. Rectified signals from circuits 40 are combined at common node 48 to provide a composite signal which is applied to comparator 46. The composite signal includes demodulated data or information of signals 18.

Stub circuits 42 may be utilized to increase sensitivity and maximize efficiency and performance of device 14. Exemplary stub circuits 42 are described in a U.S. patent application entitled "Antenna Matching Circuit," having Ser. No. 09/797,539, and the teachings of which are incorporated herein by reference.

Adaptive reference circuit 44 is configured to apply a reference signal to comparator 46 for use in comparison with the composite signal via comparator 46. Adaptive reference circuit 44 varies a voltage of the reference signal responsive to the composite signal in the depicted embodiment. Utilization of adaptive reference circuit 44 enhances the sensitivity of device 18.

Comparator 46 is coupled with rectifying circuits 40 and adaptive reference circuit 44 and is configured to compare the composite signal with the reference signal and to output data (e.g., FM0 data) for application to processing circuitry 33 and wake-up circuitry 34.

Referring to FIGS. 4 and 5, an exemplary layout of circuit components of a primary side (FIG. 4) and a secondary side (FIG. 5) of one possible embodiment of device 14 is shown. The illustrated exemplary embodiment is configured for applications using wireless communications having a carrier frequency of approximately 2.44 GHz.

Referring to FIG. 4, the circuit components (corresponding to the exemplary components of FIGS. 3A–3B) may be placed upon a base material 60 which may be implemented using a laminate having a designation RO4003 and which is available from the Microwave Materials Division of Rogers Corporation of Chandler, Az., USA. An exemplary circuit board trace pattern 61 is shown for electrically connecting the circuit components.

Antennas 30 are shown arranged in an opposing relationship with respect to one another. The antennas 30 of the exemplary embodiment comprise meander lines individually arranged in a compressed dipole configuration. Antennas 30 are tuned to 2.44 GHz in the illustrated configuration and individually form a dipole antenna in conjunction with a ground plane (FIG. 5). Stub circuits 42 are also shown arranged in an opposing relationship with respect to one another and provided adjacent to respective antennas 30 to increase the sensitivity of device 14. Initial tests of communication devices 14 in a free-space configuration and having antennas 30 configured as shown in FIG. 4 provided a 10 dBm performance advantage compared with single-antenna configurations. Other configurations of antennas 30 are possible.

Referring to FIG. 5, a ground plane 62 is illustrated formed upon the secondary side of base material 60. Ground plane 62 may be formed using an exemplary circuit board trace pattern 63. Battery 36 may be positioned adjacent to ground plane 62 to provide a ground reference for antennas 30 resulting in increased sensitivity.

Figure 6:
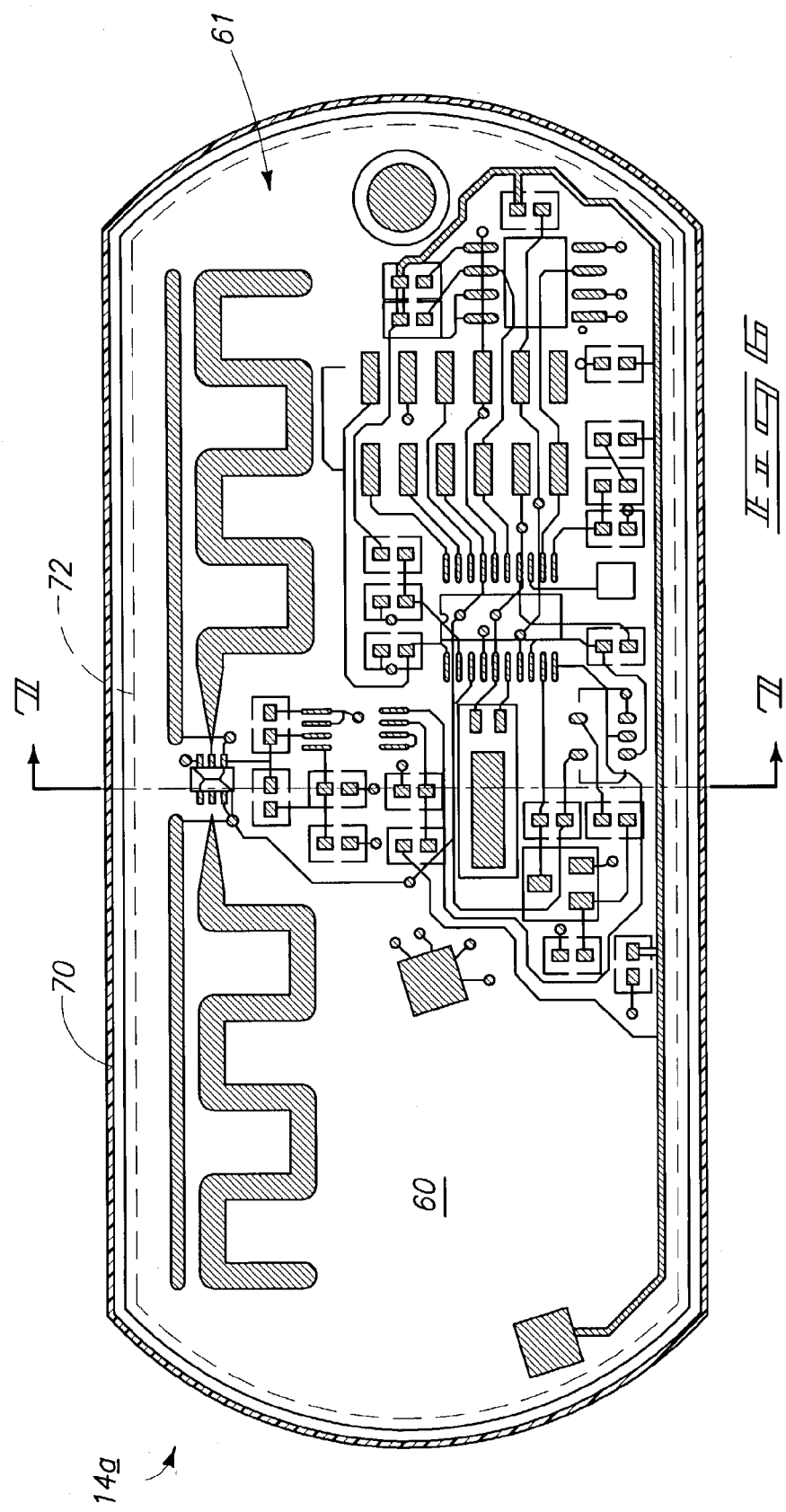
FIG. 6 is an elevational view of an embodiment of an exemplary wireless communication device in a case.
Figure 7:
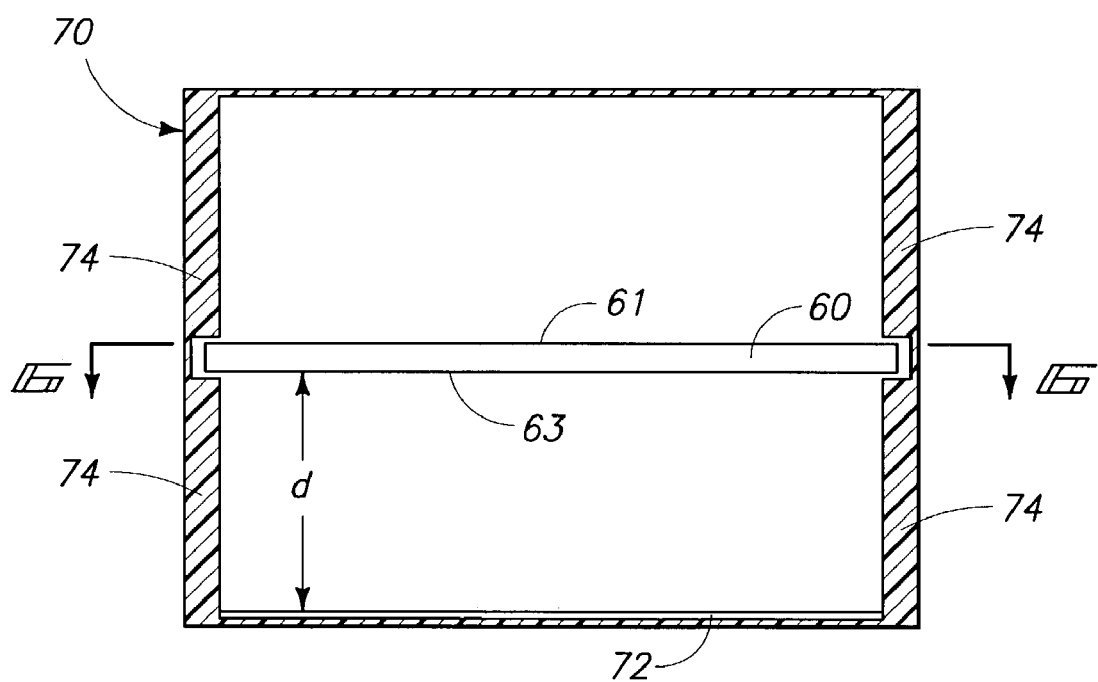
FIG. 7 is a cross-sectional view of the device of FIG. 6.

Referring to FIGS. 6 and 7, another embodiment of a wireless communication device is depicted with respect to reference 14a. Device 14a includes a case 70 about the exemplary structures of FIGS. 4 and 5 in one exemplary embodiment. The illustrated case 70 shows one possible configuration and other case configurations are possible. Alternatively, case 70 may be omitted.

Case 70 is configured to protect circuitry of device 14a in the depicted embodiment. In addition, case 70 is arranged to space a reflector 72 from circuitry of base material 60 of device 14a. Reflector 72 comprises metal in the depicted embodiment. The illustrated exemplary case 70 also includes a plurality of walls 74 configured to space circuitry of pattern 63 from reflector 72 by a desired distance d1. Exemplary distances d1 are equal to approximately ¼, ⅛, 1/16 or 1/32 of the wavelength of the carrier frequency of communication signals 18. Other distances may be provided in other configurations of case 70. Case 70 may be arranged to not substantially absorb or reflect radio frequency energy and may comprise plastic or epoxy in some exemplary embodiments. Case 70 including walls 74 may be constructed using ultrasonic welding, injection molding, etc. Air gaps may be provided intermediate base material 60 and case 70.

Case 70 and reflector 72 permit coupling of communication device 14a to another object (not shown) and placement of antennas 30 outwardly with respect to the reflector 72 and object (e.g., the end of case 70 having reflector 72 coupled with the object). The exemplary configuration of FIGS. 6–7 allows mounting of device 14a upon an object surface with minimal effects of the surface material with respect to the radio frequency communications of the device 14a (e.g., metal, water filled plastic or glass container, or other materials which may be comparatively overly reflective or absorptive of radio frequency energy). Accordingly, communication device 14a including reflector 72 may provide enhanced communications while mounted to a wide range of materials and utilized in an increased number of applications. Reflector 72 provides 180 degree directionally in the illustrated exemplary configuration.

Reflector 72 may be omitted in other configurations of case 70. In such configurations, devices 14a (or devices 14) may be used for example on the human body, in free-space, etc., providing 360 degree reading capability in both X and Y planes when used in conjunction with a configuration of communication device 12 having circularly polarized antennas.

As mentioned above, some configurations described herein include communication devices arranged with a plurality of antennas tuned to substantially the same frequency bands. This configuration may be used to provide a fail safe mode to protect against electrostatic discharge (ESD) events. For example, if one of the antennas sustains an electrostatic discharge event of sufficient voltage magnitude, internal circuitry of the device coupled with the antenna, such as rectifying circuits 40, may be disabled. The communication device could continue to operate after the disabling event, although the communications range would most likely be reduced by half.

Other configurations utilize communication devices having antennas tuned to different, respective frequency bands permitting robust operation in a plurality of frequency bands. The sensitivity of the latter configuration of devices is reduced by about half in the respective frequency bands compared with configurations of devices wherein the antennas are tuned to substantially the same frequency band.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A tag comprising:
    a plurality of antennas configured to receive a plurality of first wireless communication signals comprising data from a reader;
    a plurality of rectifying circuits coupled with respective individual ones of the antennas and configured to provide rectified signals corresponding to the first wireless communication signals, wherein the rectified signals are combined to produce a composite signal;
    an adaptive reference circuit configured to vary a reference signal responsive to the composite signal;
    a comparator coupled with the adaptive reference circuit and the rectifying circuits and configured to compare the composite signal with respect to the reference signal and to output the data responsive to the comparison; and
    processing circuitry configured to receive the data from the comparator and to process the data.

2. The tag of claim 1 wherein the antennas individually comprise a meander line.

3. The tag of claim 1 wherein the antennas individually comprise a compressed dipole antenna.

4. The tag of claim 3 further comprising a ground plane spaced from the antennas.

5. The tag of claim 4 further comprising a metal reflector spaced from the ground plane.

6. The tag of claim 1 wherein the rectifying circuits comprise cascaded voltage doubling circuits.

7. The tag of claim 1 wherein the rectifying circuits individually comprise a plurality of diodes configured as a full-wave rectifier circuit.

8. The tag of claim 1 wherein the rectifying circuits comprise a plurality of diodes and a cathode of a diode of one of the rectifying circuits and a cathode of a diode of another of the rectifying circuits are coupled via a common node.

9. The tag of claim 8 wherein the common node is coupled to an input of the comparator.

10. The tag of claim 1 wherein the processing circuitry is configured to control the tag to output a plurality of second wireless communication signals comprising backscatter signals for communication to the reader.

11. The tag of claim 10 wherein the processing circuitry is configured to control the communication of the second wireless communication signals to implement radio frequency identification device communications with the reader.

12. The tag of claim 10 wherein the processing circuitry is configured to control at least one of the antennas to output the second wireless communication signals.

13. The tag of claim 10 wherein the processing circuitry is configured to control the plurality of antennas to output the second wireless communication signals.

14. The tag of claim 1 further comprising a battery configured to provide electrical energy to the processing circuitry.

15. The tag of claim 1 wherein the antennas are tuned to substantially the same frequency band.

16. The tag of claim 1 wherein one of the antennas is substantially tuned to a first frequency band and another of the antennas is substantially tuned to a second frequency band different than the first frequency band.

17. A wireless communication system comprising:
    a reader configured to output a plurality of first wireless communication signals comprising data;

a tag comprising a plurality of antennas configured to receive the first wireless communication signals from the reader, processing circuitry configured to receive the data of the first wireless communication signals and to control backscatter modulation of radio frequency energy to communicate a plurality of second wireless communication signals to the reader, and a battery configured to provide operational electrical energy to the processing; and wherein one of the antennas is substantially tuned to a first frequency band and another of the antennas is substantially tuned to a second frequency band different than the first frequency band.

18. The system of claim 17 wherein the tag is configured to combine a plurality of electrical signals corresponding to the first wireless communication signals.

19. The system of claim 18 wherein the tag comprises a plurality of rectifying circuits coupled with respective ones of the antennas and configured to provide the electrical signals comprising rectified signals.

20. The system of claim 18 wherein the tag comprises an adaptive reference circuit configured to provide a reference signal responsive to the combined electrical signals, and a comparator configured to compare the combined electrical signals with the reference signal.

21. The system of claim 17 wherein the processing circuitry is configured to control at least one of the antennas to backscatter modulate the radio frequency energy.

22. The system of claim 17 wherein the reader is configured to communicate the radio frequency energy comprising a continuous wave signal.

23. The system of claim 17 wherein the tag comprises a radio frequency identification device.

24. The system of claim 17 wherein the tag is configured to combine plural signals corresponding to the first wireless communication signals received via the plural antennas, and to compare the combined signals with a reference signal to provide the data for reception by the processing circuitry.

25. The system of claim 24 wherein the tag is configured to adjust the reference signal using the combined signals.

26. A tag communication method comprising:
receiving a plurality of first wireless communication signals from a reader using a plurality of antennas of a tag;
providing a plurality of electrical signals within the tag and corresponding to the first wireless communication signals received using respective ones of the antennas;
combining the electrical signals using the tag;
comparing the combined electrical signals to a reference signal, the comparing generating a data signal comprising data of the first wireless communication signals;
processing the data signal using the tag; and
backscatter modulating radio frequency energy using the tag to output a plurality of second wireless communication signals for communication to the reader.

27. The method of claim 26 wherein the providing comprises rectifying the first wireless communication signals using a plurality of rectifying circuits of the tag coupled with respective ones of the antennas.

28. The method of claim 26 further comprising:
adjusting the reference signal responsive to the combined electrical signals using the tag.

29. The method of claim 26 wherein the backscatter modulating comprises backscatter modulating using at least one of the antennas.

30. The method of claim 26 further comprising providing the tag comprising a radio frequency identification device.

31. The method of claim 26 wherein the processing comprises processing using processing circuitry, and further comprising supplying electrical energy to the processing circuitry using a battery of the tag.

32. The method of claim 26 further comprising providing the tag including the antennas tuned to substantialiy the same frequency band.

33. The method of claim 26 further comprising providing the tag including one of the antennas substantially tuned to a first frequency band and another of the antennas substantially tuned to a second frequency band different than the first frequency band.

34. The method of claim 26 wherein the plurality of antennas of the tag are substantially tuned to respective different frequency bands.

35. A wireless communication method comprising:
providing a reader;
providing a tag comprising a plurality of antennas;
outputting a plurality of first wireless communication signals comprising data using the reader;
receiving the first wireless communication signals using the antennas of the tag;
combining electrical signals corresponding to respective ones of the first wireless communication signals within the tag;
providing data comprising comparing the combined electrical signals to a reference signal using the tag; and
processing the data using processing circuitry of the tag after the comparing.

36. The method of claim 35 further comprising rectifying the first wireless communication signals within the tag to provide the electrical signals, and the combining comprises combining after the rectifying.

37. The method of claim 35 wherein the providing the data comprises comparing the combined electrical signals to the reference signal comprising an adaptive reference signal using the tag and prior to the processing.

38. The method of claim 35 further comprising communicating a plurality of second wireless communication signals from the tag to the reader.

39. The method of claim 38 wherein the communicating comprises backscatter modulating radio frequency energy to communicate the second wireless communication signals.

40. The method of claim 39 wherein the communicating comprises backscatter modulating using the antennas of the tag.

41. The method of claim 35 wherein the providing the tag comprises providing a radio frequency identification device.

42. The method of claim 35 further comprising supplying electrical energy to the processing circuitry using a battery of the tag.

43. The method of claim 35 wherein the providing the tag comprises providing the tag including the antennas tuned to substantially the same frequency band.

44. The method of claim 35 wherein the providing the tag comprises providing the tag including one of the antennas substantially tuned to a first frequency band and another of the antennas substantially tuned to a second frequency band different than the first frequency band.

45. The method of claim 35 further comprising adjusting the reference signal using the combined electrical signals.

46. The method of claim 35 wherein the plurality of antennas of the tag are substantially tuned to respective different frequency bands.

47. A wireless communication system comprising:
a reader configured to output a plurality of first wireless communication signals comprising data;

a tag comprising a plurality of antennas configured to receive the first wireless communication signals from the reader, processing circuitry configured to receive the data of the first wireless communication signals and to control backscatter modulation of radio frequency energy to communicate a plurality of second wireless communication signals to the reader, and a battery configured to provide operational electrical energy to the processing circuitry; and wherein the tag comprises an adaptive reference circuit configured to provide a reference signal responsive to the combined electrical signals, and a comparator configured to compare the combined electrical signals with the reference signal.

48. A tag communication method comprising:

receiving a plurality of first wireless communication signals from a reader using a plurality of antennas of a tag;

providing a plurality of electrical signals within the tag and corresponding to the first wireless communication signals received using respective ones of the antennas;

combining the electrical signals using the tag;

processing the combined electrical signals using the tag;

backscatter modulating radio frequency energy using the tag to output a plurality of second wireless communication signals for communication to the reader;

adjusting a reference signal responsive to the electrical signals using the tag;

comparing the combined electrical signals to the reference signal using the tag; and providing data responsive to the comparing using the tag, and the processing comprises processing the data using processing circuitry.

49. A wireless communication method comprising:

providing a reader;

providing a tag comprising a plurality of antennas;

outputting a plurality of first wireless communication signals comprising data using the reader;

receiving the first wireless communication signals using the antennas of the tag;

combining electrical signals corresponding to respective ones of the first wireless communication signals within the tag;

processing data of the combined electrical signals using processing circuitry of the tag after the combining; and providing the data comprising comparing the combined electrical signals to an adaptive reference signal using the tag and prior to the processing.

* * * * *

UNITED STATES PATENT AND TRADEMARK OFFICE
CERTIFICATE OF CORRECTION

| | | |
|---|---|---|
| PATENT NO. | : 7,106,173 B2 | Page 1 of 1 |
| APPLICATION NO. | : 10/336086 | |
| DATED | : September 12, 2006 | |
| INVENTOR(S) | : Scott et al. | |

It is certified that error appears in the above-identified patent and that said Letters Patent is hereby corrected as shown below:

Title Page, FOREIGN PATENT DOCUMENTS, please delete "WO 0171645" before 9/2001 and insert --WO 0171848--.

Col. 5, line 8, please delete "wireless." after "from the" and insert --wireless--.

Col. 5, line 33, please delete "Wake-Up," after "Device" and insert --Wake-Up--.

Col. 5, line 34, please delete "Wake-Up," after "Device" and insert --Wake-Up--.

Col. 9, line 9, claim 17, please delete "processing;" after "the" and insert --processing circuitry;--.

Col. 10, line 6, claim 32, please delete "substantialiy" after "tuned to" and insert --substantially--.

Signed and Sealed this

Seventeenth Day of June, 2008

JON W. DUDAS
*Director of the United States Patent and Trademark Office*